(12) United States Patent
Asano et al.

(10) Patent No.: US 11,629,075 B2
(45) Date of Patent: Apr. 18, 2023

(54) WATER ELECTROLYSIS SYSTEM AND WATER LEVEL ERROR CALCULATION APPARATUS

(71) Applicant: Honda Motor Co., Ltd., Tokyo (JP)

(72) Inventors: Yuji Asano, Wako (JP); Jun Takeuchi, Wako (JP); Kazuya Aoki, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 248 days.

(21) Appl. No.: 17/174,294

(22) Filed: Feb. 11, 2021

(65) Prior Publication Data

US 2021/0261446 A1   Aug. 26, 2021

(30) Foreign Application Priority Data

Feb. 21, 2020   (JP) .............................. JP2020-027690

(51) Int. Cl.
*C02F 1/461*   (2023.01)
*C25B 1/04*   (2021.01)

(52) U.S. Cl.
CPC ............ *C02F 1/46109* (2013.01); *C25B 1/04* (2013.01); *C02F 2201/4612* (2013.01); *C02F 2209/03* (2013.01); *C02F 2209/42* (2013.01)

(58) Field of Classification Search
CPC ........ Y20E 60/36; C02F 1/20; C02F 1/46104; C02F 1/46109; C02F 2201/4612; C02F 2209/03; C02F 2209/42; C25B 15/02; C25B 15/023; C25B 15/083; G01F 23/804; G01F 25/20; B01D 19/0063
See application file for complete search history.

(56) References Cited

U.S. PATENT DOCUMENTS 5,690,797 A  * 11/1997 Harada ................... C25B 1/04
                                                    204/266
2006/0260934 A1* 11/2006 Blenkiron ............. C25B 15/08
                                                    204/246

(Continued)

FOREIGN PATENT DOCUMENTS

| JP | 2012241252 A |   | 12/2012 |
| JP | 2014043615 A | * | 3/2014 |
| JP | 2014043615 A |   | 3/2014 |

OTHER PUBLICATIONS

Machine translation of JP-2014/043615 A to English, retrieved Dec. 8, 2022 via ESpaceNet, 14 pages. (Year: 2014).*

(Continued)

*Primary Examiner* — Luan V Van
*Assistant Examiner* — Andrew Koltonow
(74) *Attorney, Agent, or Firm* — Duft & Bornsen, PC

(57) ABSTRACT

A water electrolysis system includes: a water electrolyzer configured to electrolyze water to generate gas including oxygen and hydrogen; a gas-liquid separator configured to separate gas phase including hydrogen from liquid phase of the gas generated by the water electrolyzer; a water level detector configured to detect a water level in the gas-liquid separator; a pressure detector configured to detect a pressure of the gas phase in the gas-liquid separator; and a CPU and a memory coupled to the CPU. The CPU is configured to perform: calculating an error of the water level in the gas-liquid separator detected by the water level detector based on the pressure of the gas phase in the gas-liquid separator detected by the pressure detector.

14 Claims, 3 Drawing Sheets

(56) References Cited

U.S. PATENT DOCUMENTS

| | | | | |
|---|---|---|---|---|
| 2012/0298520 A1* | 11/2012 | Takeuchi | ................ | C25B 1/04 |
| | | | | 205/335 |
| 2017/0307461 A1* | 10/2017 | Van Bekkum | ...... | G01S 7/52004 |
| 2019/0024248 A1* | 1/2019 | Takeuchi | ................ | C25B 1/04 |

OTHER PUBLICATIONS

Japanese Office Action; Application 2020-027690; dated Sep. 21, 2021.

* cited by examiner

WATER ELECTROLYSIS SYSTEM AND WATER LEVEL ERROR CALCULATION APPARATUS

CROSS-REFERENCE TO RELATED APPLICATION

This application is based upon and claims the benefit of priority from Japanese Patent Application No. 2020-027690 filed on Feb. 21, 2020, the content of which is incorporated herein by reference.

BACKGROUND OF THE INVENTION

Field of the Invention

This invention relates to a water electrolysis system for electrolyzing water to generate oxygen and hydrogen, and a water level error calculation apparatus for calculating detection error of water level based on pressure.

Description of the Related Art

As such a system, a system that electrolyzes water using an electrolyte membrane to generate oxygen and hydrogen is known. For example, the system disclosed in JP 2014-43615 A is configured to store water that has passed through an electrolyte membrane in a gas-liquid separator, and to drain a part of the water when a water level in the gas-liquid separator reaches a predetermined water level, and uses an electrostatic capacity-type water level sensor for detecting the water level in the gas-liquid separator.

However, the system disclosed in JP 2014-43615 A uses the electrostatic capacity-type water level sensor, and therefore has difficulty in calculating a detection error of the water level in the gas-liquid separator.

SUMMARY OF THE INVENTION

An aspect of the present invention is a water electrolysis system, including: a water electrolyzer configured to electrolyze water to generate gas including oxygen and hydrogen; a gas-liquid separator configured to separate a gas phase including hydrogen from a liquid phase of the gas generated by the water electrolyzer; a water level detector configured to detect a water level in the gas-liquid separator; a pressure detector configured to detect a pressure of the gas phase in the gas-liquid separator; and a CPU and a memory coupled to the CPU. The CPU is configured to perform: calculating an error of the water level in the gas-liquid separator detected by the water level detector based on the pressure of the gas phase in the gas-liquid separator detected by the pressure detector.

Another aspect of the present invention is a water electrolysis system, including: a water electrolyzer configured to electrolyze water to generate gas including oxygen and hydrogen; a gas-liquid separator configured to separate gas phase including hydrogen from liquid phase of the gas generated by the water electrolyzer; a water level detector configured to detect a water level in the gas-liquid separator; a pressure detector configured to detect a pressure of the gas phase in the gas-liquid separator; and a CPU and a memory coupled to the CPU. The CPU is configured to function as: an arithmetic unit configured to calculate an error of the water level in the gas-liquid separator detected by the water level detector based on the pressure of the gas phase in the gas-liquid separator detected by the pressure detector.

Another aspect of the present invention is a water level error calculation apparatus configured to calculate a detection error of a water level in a gas-liquid separator. The water level error calculation apparatus includes: a water level detector configured to detect the water level in the gas-liquid separator; a pressure detector configured to detect a pressure of a gas phase in the gas-liquid separator; and a CPU and a memory coupled to the CPU. The CPU is configured to perform: calculating the detection error of the water level in the gas-liquid separator detected by the water level detector based on the pressure of the gas phase in the gas-liquid separator detected by the pressure detector.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

An embodiment of the present invention will be described below with reference to FIGS. 1 to 4. A water electrolysis system according to the present embodiment is a so-called package type water electrolysis system the whole of which is housed in a container or the like. The size of the container is, for example, about 300 to 400 mm in width, about 200 to 300 mm in depth, and about 200 to 300 mm in height.

Figure 1:
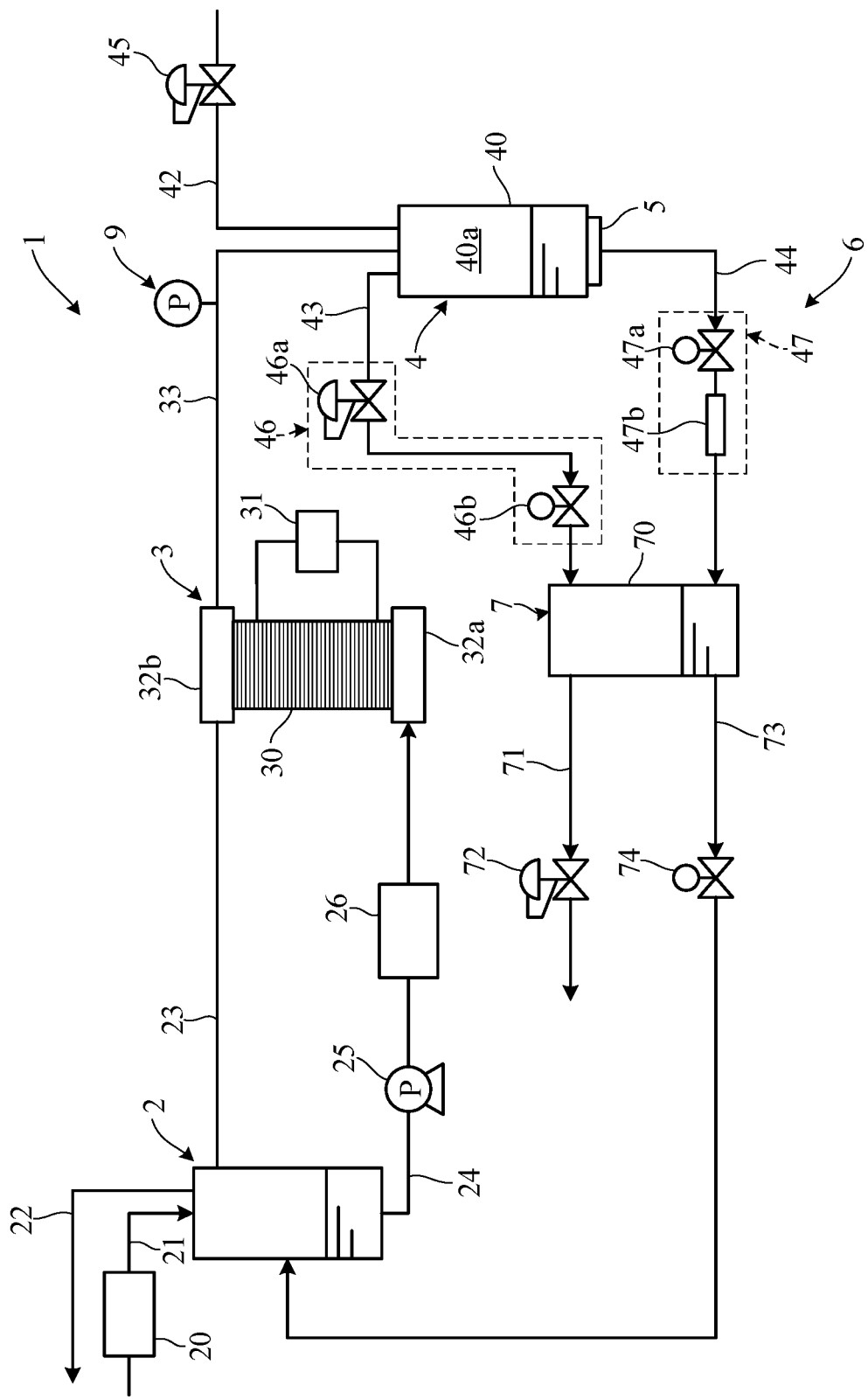
FIG. 1 is a schematic configuration diagram of a water electrolysis system according to an embodiment of the present invention.

FIG. 1 is a schematic configuration diagram of the water electrolysis system according to the present embodiment. As illustrated in FIG. 1, a water electrolysis system 1 includes: a pure water gas-liquid separator 2 that stores pure water (hereinafter, also simply referred to as "water"); a high-pressure water electrolysis stack 3 that electrolyzes water to generate oxygen and hydrogen; a high-pressure gas-liquid separator 4 that performs gas-liquid separation on hydrogen; a weight sensor 5 that detects the weight of the high-pressure gas-liquid separator 4, a high-pressure draining device 6 that discharges water stored in the high-pressure gas-liquid separator 4, and a low-pressure gas-liquid separator 7 that supplies water discharged by the high-pressure draining device 6 to the pure water gas-liquid separator 2. Note that the pure water gas-liquid separator 2, the high-pressure water electrolysis stack 3, the high-pressure gas-liquid separator 4, and the low-pressure gas-liquid separator 7 in FIG. 1 are illustrated in the gravity direction.

To an upper portion of the pure water gas-liquid separator 2, one end of each of a pure water supply line 21, a gas discharge line 22, and a circulation line 23 is connected. The other end of the pure water supply line 21 is connected to a pure water manufacturing apparatus 20 that manufactures pure water (water). The other end of the gas discharge line 22 is open to the atmosphere. The other end of the circulation line 23 is connected to the high-pressure water electrolysis stack 3. To a bottom of the pure water gas-liquid separator 2, one end of a supply line 24 is connected, and the other end of the supply line 24 is connected to the high-pressure water electrolysis stack 3 through a circulating water pump 25 and a cooler 26.

To the pure water gas-liquid separator 2, water is supplied from the pure water manufacturing apparatus 20 through the pure water supply line 21, and mixed gas of oxygen and hydrogen is supplied from the high-pressure water electrolysis stack 3 through the circulation line 23. From the mixed gas supplied from the high-pressure water electrolysis stack 3, water that has been liquefied in the pure water gas-liquid separator 2 is separated, and the mixed gas from which the water has been separated is discharged to the atmosphere through the gas discharge line 22. Then, water separated from the mixed gas, unreacted water, and water supplied from the pure water manufacturing apparatus 20 are stored in the pure water gas-liquid separator 2 and supplied by the circulating water pump 25 to the high-pressure water electrolysis stack 3 through the supply line 24.

The high-pressure water electrolysis stack 3 electrolyzes water supplied from the pure water gas-liquid separator 2 to generate oxygen and hydrogen. More specifically, to the high-pressure water electrolysis stack 3, an electrolytic power source 31, which is a DC power source, is connected. When a predetermined electrolytic voltage is applied to the high-pressure water electrolysis stack 3 by the electrolytic power source 31, a predetermined electrolytic current flows in the high-pressure water electrolysis stack 3, and water is electrolyzed.

The high-pressure water electrolysis stack 3 includes a plurality of stacked water electrolysis cells 30. Each of the water electrolysis cells 30 is formed in, for example, a disk shape. Although not illustrated, each of the water electrolysis cells 30 includes an electrolyte membrane-electrode structure, and an anode separator and a cathode separator disposed on both sides of the electrolyte membrane-electrode structure. The electrolyte membrane-electrode structure includes a solid polymer electrolyte membrane, and an anode power feeder and a cathode power feeder disposed on both surfaces of the solid polymer electrolyte membrane. The anode separator has a pure water flow path in which water flows, and the cathode separator has a hydrogen flow path in which hydrogen generated by a reaction flows.

The high-pressure water electrolysis stack 3 is formed by vertically stacking the water electrolysis cells 30, and end plates 32a and 32b are disposed at both ends thereof in the stacking direction.

To the lower end plate 32a, the other end of the supply line 24 is connected. More specifically, the lower end plate 32a has an inlet communicating portion communicating with an inlet side (water supply side) of the pure water flow path formed in the anode separator of each of the water electrolysis cells 30, and the inlet communicating portion is connected to the other end of the supply line 24.

To the upper end plate 32b, the other end of the circulation line 23 and one end of a hydrogen discharge line 33 are connected. More specifically, the upper end plate 32b has a first outlet communicating portion communicating with an outlet side (water discharge side) of the pure water flow path formed in the anode separator of each of the water electrolysis cells 30, and the first outlet communicating portion is connected to the other end of the circulation line 23. The upper end plate 32b has a second outlet communicating portion communicating with an outlet side (hydrogen discharge side) of the hydrogen flow path formed in the cathode separator of each of the water electrolysis cells 30, and the second outlet communicating portion is connected to one end of the hydrogen discharge line 33.

To the circulation line 23, mixed gas containing oxygen and a part of hydrogen (hydrogen that has passed through the water electrolysis cells 30) generated by a reaction and unreacted water are discharged from the first outlet communicating portion of the upper end plate 32b. To the hydrogen discharge line 33, hydrogen gas generated by a reaction and water that has passed through the water electrolysis cells 30 are discharged from the second outlet communicating portion of the upper end plate 32b.

The high-pressure gas-liquid separator 4 separates water from hydrogen gas supplied through the hydrogen discharge line 33, and stores water separated from the hydrogen gas and water supplied through the hydrogen discharge line 33. More specifically, the high-pressure gas-liquid separator 4 separates water from hydrogen gas supplied through the hydrogen discharge line 33 such that the water content of the hydrogen gas is equal to or less than a predetermined amount (for example, 100 ppm or less). In the high-pressure gas-liquid separator 4, water contained in hydrogen gas is liquefied and separated under an atmosphere of high pressure (for example, 35 MPa or higher), and the water content of the hydrogen gas is thereby equal to or less than the predetermined amount. Water separated from hydrogen gas supplied through the hydrogen discharge line 33 is stored in the high-pressure gas-liquid separator 4 together with water supplied through the hydrogen discharge line 33.

The high-pressure gas-liquid separator 4 includes a substantially cylindrical vessel 40 with an upper end opening and a lower end opening sealed. The vessel 40 has a space having a substantially constant cross-sectional area in a height direction inside thereof. In this space, hydrogen gas which has been supplied through the hydrogen discharge line 33 and the water content of which has become equal to or less than the predetermined amount, water separated from the hydrogen gas, and water supplied through the hydrogen discharge line 33 are stored.

Note that the shape of the space of the vessel 40 of the high-pressure gas-liquid separator 4 is not limited to the above shape, and may be, for example, a shape having different cross-sectional areas in the height direction. In the high-pressure gas-liquid separator 4, the vessel 40 is formed so as to be thick (for example, thicker than a vessel 70 of the low-pressure gas-liquid separator 7) from a viewpoint of storing high-pressure hydrogen gas.

To an upper portion of the vessel 40, the other end of the hydrogen discharge line 33, one end of a high-pressure hydrogen supply line 42, and one end of a depressurization line 43 are connected. The other end of the high-pressure hydrogen supply line 42 is connected to a hydrogen tank (not illustrated) through a back pressure valve 45. The hydrogen tank stores the hydrogen gas the water content of which has become equal to or less than the predetermined amount (for example, 5 ppm or less when hydrogen gas is supplied to a fuel cell vehicle). The other end of the depressurization line 43 is connected to the low-pressure gas-liquid separator 7 through a decompression mechanism 46. To a bottom of the vessel 40, one end of a discharge line 44 is connected, and the other end of the discharge line 44 is connected to the low-pressure gas-liquid separator 7 through the high-pressure draining device 6.

The back pressure valve 45 disposed in the high-pressure hydrogen supply line 42 is set to a predetermined pressure value (for example, 70 MPa). Then, when an internal pressure of the vessel 40 exceeds the predetermined pressure value, hydrogen gas is supplied to the hydrogen tank through the back pressure valve 45, and the internal pressure of the vessel 40 is maintained at the predetermined pressure value. The decompression mechanism 46 disposed in the depressurization line 43 includes, for example, a decompression valve 46a that decompresses hydrogen gas to a set pressure by imparting a pressure loss, and a solenoid valve 46b. The high-pressure draining device 6 includes a drainage decompression mechanism 47. The drainage decompression mechanism 47 includes, for example, an orifice 47b through which a set amount of water flows by imparting a pressure loss, and a solenoid valve 47a. The drainage decompression mechanism 47 can use, for example, a decompression valve instead of the orifice 47b.

At a bottom of the high-pressure gas-liquid separator 4, the weight sensor 5 is disposed in contact with a bottom of the vessel 40. The weight sensor 5 detects a load acting on the vessel 40 in the direction of gravity, that is, the total weight of the high-pressure gas-liquid separator 4.

The low-pressure gas-liquid separator 7 stores water discharged by the high-pressure draining device 6 and hydrogen gas decompressed by the decompression mechanism 46. More specifically, the low-pressure gas-liquid separator 7 includes the vessel 70 that stores decompressed hydrogen gas and water. To an upper portion of the vessel 70, one end of an atmospheric line 71 is connected, and the other end of the atmospheric line 71 is opened. The atmospheric line 71 includes a back pressure valve 72, and pressure in the vessel 70 is kept at a pressure equal to or higher than the atmospheric pressure to prevent inflow of the atmosphere into the vessel 70. To a lower portion of the vessel 70, one end of a water return line 73 is connected, and the other end of the water return line 73 is connected to the pure water gas-liquid separator 2 through a solenoid valve 74.

Figure 2:
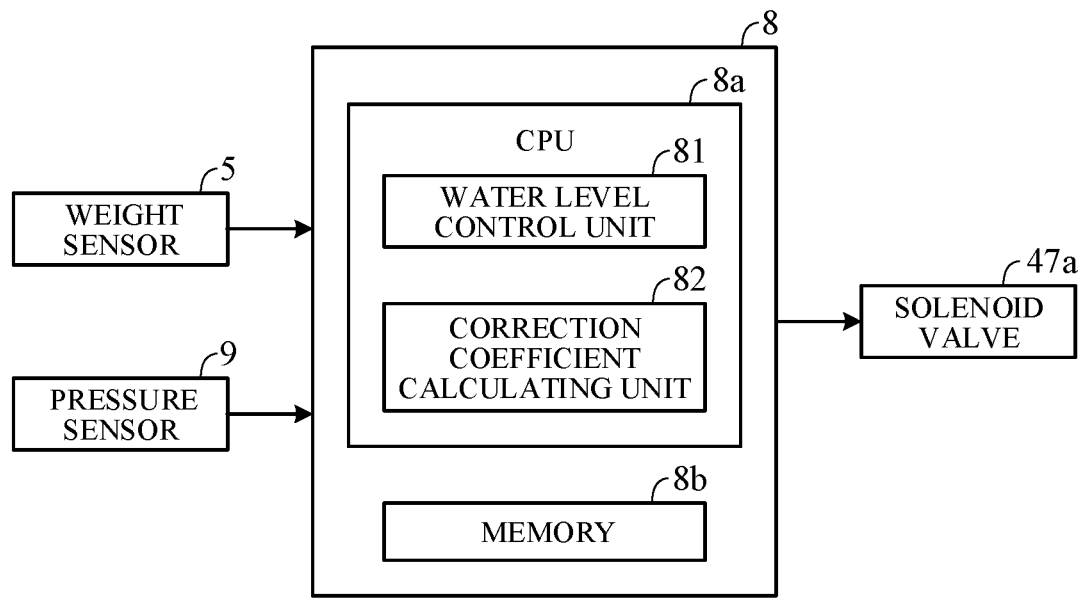
FIG. 2 is a block diagram illustrating a schematic configuration of a main part of the water electrolysis system according to the present embodiment.

An example of hydrogen manufacturing operation by the above water electrolysis system 1 will be described. Note that each unit of the water electrolysis system 1 is controlled by a controller 8 (FIG. 2). At the time of starting operation of the water electrolysis system 1, water generated in the pure water manufacturing apparatus 20 is supplied to the pure water gas-liquid separator 2 through the pure water supply line 21. Water in the pure water gas-liquid separator 2 is supplied to the high-pressure water electrolysis stack 3 through the supply line 24 by driving the circulating water pump 25.

Water supplied to the high-pressure water electrolysis stack 3 is supplied from the lower end plate 32a to an inlet side of the pure water flow path formed in the anode separator of each of the water electrolysis cells 30, and moves along the anode power feeder. At this time, a predetermined electrolytic voltage is applied to the high-pressure water electrolysis stack 3 through the electrolytic power source 31, and water is electrolyzed in an anode electrode catalyst layer to generate hydrogen ions, electrons, and oxygen. The hydrogen ions generated by the anode reaction pass through the solid polymer electrolyte membrane, move to a side of a cathode electrode catalyst layer, and are bonded to electrons to obtain hydrogen (hydrogen gas). The obtained hydrogen (hydrogen gas) is supplied from an outlet side (hydrogen discharge side) of the hydrogen flow path formed in the cathode separator to the hydrogen discharge line 33. Water that has passed through the solid polymer electrolyte membrane is also discharged from the outlet side (hydrogen discharge side) of the hydrogen flow path.

At this time, the back pressure valve 45, the decompression valve 46a, and the solenoid valve 47a are closed, and one end of the discharge line 44 is sealed with water (hereinafter, also referred to as "sealing water") stored in the vessel 40 to seal the vessel 40. Therefore, the obtained hydrogen (hydrogen gas) and the discharged water are supplied into the vessel 40 through the hydrogen discharge line 33, and pressure in the vessel 40 thereby rises. More specifically, hydrogen gas and water are supplied to the sealed vessel 40, and the vessel 40, the hydrogen discharge line 33, the high-pressure hydrogen supply line 42 to the back pressure valve 45, and the depressurization line 43 to the decompression mechanism 46 are boosted to a predetermined pressure value (for example, 70 MPa).

Meanwhile, oxygen (oxygen gas) generated by a reaction, hydrogen (hydrogen gas) that has passed through the solid polymer electrolyte membrane, and unreacted water are supplied from an outlet side (water discharge side) of the pure water flow path formed in the anode separator to the circulation line 23. The mixed gas (oxygen gas and hydrogen gas) and the unreacted water supplied to the circulation line 23 are supplied to the pure water gas-liquid separator 2, and water liquefied from the mixed gas is separated by the pure water gas-liquid separator 2. The mixed gas from which water has been separated is discharged to the atmosphere through the gas discharge line 22. The liquefied water and the unreacted water are supplied to the supply line 24 again through the circulating water pump 25.

From the hydrogen gas supplied into the vessel 40 through the hydrogen discharge line 33, water is separated by gravity in the vessel 40, and the water content thereof becomes equal to or less than a predetermined amount. The hydrogen gas the water content of which has become equal to or less than the predetermined amount is stored in the vessel 40. Similarly, the water supplied into the vessel 40 through the hydrogen discharge line 33 is stored in the vessel 40 together with the water separated from the hydrogen gas.

At this time, based on the weight of the high-pressure gas-liquid separator 4 detected by the weight sensor 5, the solenoid valve 47a is opened or closed such that the water level in the vessel 40 is within a predetermined range. More specifically, when the water level in the vessel 40 reaches an upper limit water level, the solenoid valve 47a is opened and drainage is started such that the vessel 40 is not filled with water stored and the whole amount of the stored water does not go out of the vessel 40. Thereafter, when the water level reaches a lower limit water level, the solenoid valve 47a is closed and the drainage is stopped.

By draining water when the water level reaches the upper limit water level, it is possible to prevent water from flowing into the hydrogen tank through the high-pressure hydrogen supply line 42. By stopping the drainage when the water level reaches the lower limit water level, it is possible to prevent loss of sealing water, and to maintain the pressure in the vessel 40 or the like at a predetermined pressure (for example, 70 MPa).

The water discharged from the high-pressure gas-liquid separator 4 is supplied to the vessel 70 of the low-pressure gas-liquid separator 7 through the discharge line 44, and returned to the pure water gas-liquid separator 2 through the water return line 73 depending on opening or closing of the solenoid valve 74.

Meanwhile, when the sealed vessel 40 is boosted to a predetermined pressure value (for example, 70 MPa), the hydrogen gas supplied to the high-pressure gas-liquid separator 4 through the hydrogen discharge line 33 is discharged from the back pressure valve 45 disposed in the high-pressure hydrogen supply line 42, dehumidified by a dehumidifier (not illustrated) or the like to become dry hydrogen (product hydrogen), and supplied to the hydrogen tank.

When the high-pressure gas-liquid separator 4 is decompressed (for example, during maintenance), the hydrogen gas stored in the vessel 40 is decompressed by the decompression mechanism 46 and supplied to the low-pressure gas-liquid separator 7. Furthermore, the back pressure valve 72 is opened, and the decompressed hydrogen gas is discharged to the outside through the atmospheric line 71.

As described above, in the water electrolysis system 1 according to the present embodiment, the solenoid valve 47a is opened or closed based on the weight of the high-pressure gas-liquid separator 4 detected by the weight sensor 5, and the water level in the vessel 40 of the high-pressure gas-liquid separator 4 is adjusted. That is, the weight sensor 5 functions as a water level detector to adjust the water level in the vessel 40.

In this case, since the hydrogen discharge line 33 and the like are connected to the vessel 40, an error may occur between a weight detected by the weight sensor 5 and the actual weight of the high-pressure gas-liquid separator 4. Therefore, the water level in the vessel 40 cannot be kept within a predetermined range. The water level may exceed the upper limit water level to make the vessel 40 filled with water, or the water level falls below the lower limit water level to lose the sealing water in the vessel 40.

In order to cope with such a problem, the water electrolysis system 1 is configured as follows. FIG. 2 is a block diagram illustrating a schematic configuration of a main part of the water electrolysis system 1 according to the present embodiment. As illustrated in FIG. 2, the water electrolysis system 1 includes the controller 8, and the weight sensor 5, the solenoid valve 47a, and the pressure sensor 9 each communicatively connected to the controller 8.

The pressure sensor 9 is attached to piping forming the hydrogen discharge line 33 and detects an internal pressure of the vessel 40 of the high-pressure gas-liquid separator 4. That is, in the water electrolysis system 1, since the internal pressure of the hydrogen discharge line 33 is the same as the internal pressure of the vessel 40, by attaching the pressure sensor 9 on the hydrogen discharge line 33, the internal pressure of the vessel 40 can be detected with an inexpensive configuration. Note that the pressure sensor 9 may be attached inside the vessel 40.

The controller 8 includes a microcomputer including a CPU 8a and a memory 8b such as a ROM or a RAM. The controller 8 includes, as a functional configuration, a water level control unit 81 (drainage control unit) that controls the water level in the vessel 40 based on the weight of the high-pressure gas-liquid separator 4 detected by the weight sensor 5, and a correction coefficient calculating unit 82 (arithmetic unit) that calculates a correction coefficient used for correcting the weight of the high-pressure gas-liquid separator 4 detected by the weight sensor 5. That is, the CPU 8a functions as the water level control unit 81 (drainage control unit) and the correction coefficient calculating unit 82 (arithmetic unit).

The water level control unit 81, for example, opens the solenoid valve 47a when the current weight of the present high-pressure gas-liquid separator 4 detected by the weight sensor 5 reaches the weight at the upper limit water level, and closes the solenoid valve 47a when the current weight of the present high-pressure gas-liquid separator 4 reaches the weight at the lower limit water level. That is, the water level control unit 81 controls the water level in the vessel 40 by opening or closing the solenoid valve 47a. When a correction coefficient is calculated by the correction coefficient calculating unit 82, the water level control unit 81 corrects the weight detected by the weight sensor 5 with the correction coefficient, and controls the water level based on the weight corrected by the correction coefficient.

Note that the upper limit water level is a water level preset by a user (for example, a water level of 80% of full capacity), and the lower limit water level is a water level preset by the user (for example, a water level of 30% of full capacity). As the weight at the upper limit water level (lower limit water level), for example, a value obtained by calculating the volume and weight of water in the vessel 40 at the upper limit water level (lower limit water level) and adding the weight of the high-pressure gas-liquid separator 4 in an empty state to the calculated weight is used.

Figure 3:
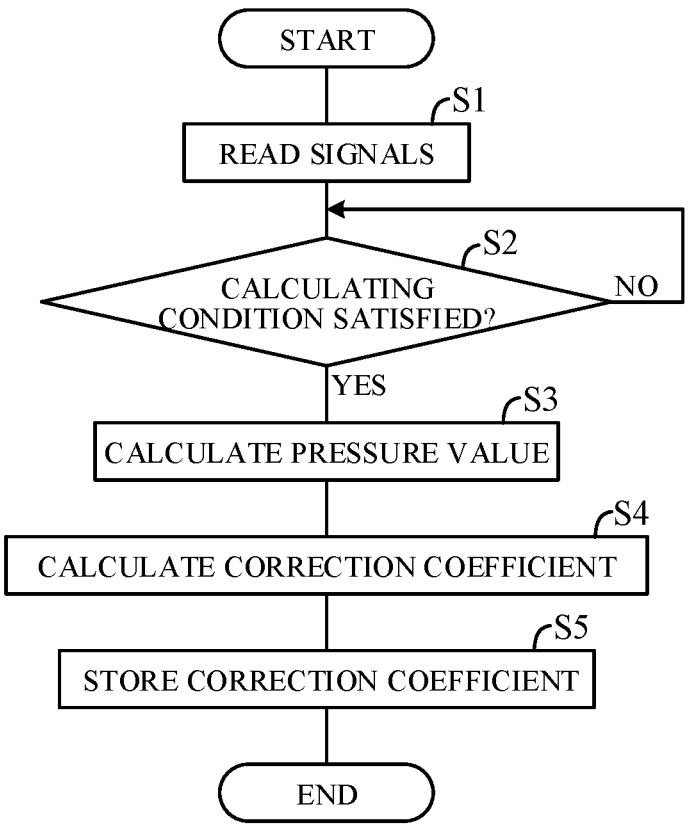
FIG. 3 is a flowchart illustrating an example of a correction coefficient calculating process executed by a correction coefficient calculating unit of a controller illustrated in FIG. 2.

FIG. 3 is a flowchart illustrating an example of the correction coefficient calculating process executed by the correction coefficient calculating unit 82 of the controller 8 illustrated in FIG. 2. The process illustrated in the flowchart of FIG. 3 is started by a command from a user, and is repeatedly executed at a predetermined cycle until the calculation of the correction coefficient ends. More specifically, when a command from a user is input, application of an electrolytic voltage is started by the electrolytic power source 31, and the process illustrated in the flowchart of FIG. 3 is executed.

As illustrated in FIG. 3, first, in S1 (S: process step), various signals relating to the high-pressure gas-liquid separator 4 are read. That is, the measured pressure value in the vessel 40 detected by the pressure sensor 9, the current weight of the present high-pressure gas-liquid separator 4 detected by the weight sensor 5, and the like are read. The read signals are stored in the memory 8b (for example, a ROM).

Subsequently, in S2, it is determined whether or not a condition for calculating the correction coefficient is satisfied. The calculation condition is a condition for effectively calculating the correction coefficient. For example, when the measured pressure value detected by the pressure sensor 9 is equal to or more than a predetermined value (for example, 30 MPa or more), the calculation condition is satisfied. Therefore, in step S2, it is determined whether or not the pressure detected by the pressure sensor 9 is equal to or more than the predetermined value.

S2 is repeated until the calculation condition is satisfied, and if the calculation condition is satisfied in S2, the process proceeds to S3. In S3, a pressure value is calculated based on the weight of the high-pressure gas-liquid separator 4 detected by the weight sensor 5. The pressure value is calculated as follows.

First, by using the amount Q [NL] of hydrogen manufactured by the high-pressure water electrolysis stack 3 after application of an electrolytic voltage (boosting) by the electrolytic power source 31 is started, the known amount Q1 [NL] of hydrogen existing in the vessel 40 in advance, the known amount S [NL] of saturated steam, and the volume V (L) of the internal space 40a obtained by subtracting the volume of water from the volume of the vessel 40, the internal pressure P [MPa] of the vessel 40 of the high-pressure gas-liquid separator 4 is calculated by the following formula (I).

$$P = (Q+Q1+S)/V \tag{I}$$

Since an electrolysis reaction of water proceeds according to an electrolytic current flowing in the high-pressure water electrolysis stack 3 by applying the electrolytic voltage, the amount Q of hydrogen manufactured by the high-pressure water electrolysis stack 3 is calculated based on the known electrolytic current.

More specifically, in the electrolysis reaction of water in the water electrolysis cells 30 of the high-pressure water electrolysis stack 3, the following formula (II) is satisfied on the anode side, the following formula (III) is satisfied on the cathode side, and the following formula (IV) is satisfied as a whole.

$$H_2O \rightarrow 2H^+ + 2e^- + 1/2 O_2 \tag{II}$$

$$2H^+ + 2e^- \rightarrow H_2 \tag{III}$$

$$H_2O \rightarrow H_2 + 1/2 O_2 \tag{IV}$$

When 1 mol of water reacts in the electrolysis reaction of water, the charge amount [C/mol] is 2×96500 [C/mol], and the amount of hydrogen [NL] is 1 [mol]=22.4 [NL]. Therefore, the amount of hydrogen manufactured in one cell per unit time [NL/sec] is calculated by the following formula (V).

$$\text{Hydrogen [NL/sec]} = \text{Current [A]}/(2 \times 96500) \times 22.4 \tag{V}$$

Then, by using an applied current e [A], the number n of stacked water electrolysis cells 30 [pieces], and application time of the electrolytic voltage (boosting time) t [min], the amount Q of hydrogen manufactured by the high-pressure water electrolysis stack 3 after application of the electrolytic voltage (boosting) is started is calculated by the following formula (VI).

$$Q = e/(2 \times 96500) \times 22.4 \times n \times t \tag{VI}$$

At this time, as the amount Q of hydrogen manufactured by the high-pressure water electrolysis stack 3, the amount of hydrogen obtained by subtracting the known amount of hydrogen discharged from the circulation line 23 by passing through the high-pressure water electrolysis stack 3 from the amount of hydrogen actually manufactured by the high-pressure water electrolysis stack 3 is used. Since the high-pressure water electrolysis stack 3 generates hydrogen in a rated operation, the amount of hydrogen discharged from the circulation line 23 by passing through the high-pressure water electrolysis stack 3 can be measured previously. When the internal pressure P of the vessel 40 is calculated, it is necessary to appropriately perform temperature correction based on temperature T of a place where the high-pressure gas-liquid separator 4 is disposed (for example, in a container) and compression coefficient correction of hydrogen manufactured. When temperature T is substantially constant as in a container, the known amount of saturated steam is substantially constant.

Next, by using the volume V1 of the vessel 40 and the volume V2 of water in the vessel 40, the volume V of the internal space 40a of the vessel 40 obtained by subtracting the volume of water from the volume of the vessel 40 is calculated by the following formula (VII).

$$V = V1 - V2 \tag{VII}$$

Note that the volume V2 of water in the vessel 40 can be calculated by using the weight of water in the vessel 40 obtained by subtracting the previously measured weight of the high-pressure gas-liquid separator 4 in an empty state from the weight of the high-pressure gas-liquid separator 4 measured by the weight sensor 5.

By substituting the volume V calculated by the above formula (VII) and the amount Q of hydrogen calculated by the above formula (VI) in the above formula (I), it is possible to calculate the internal pressure P of the vessel 40 after application of the electrolytic voltage (boosting) is started.

Subsequently, in S4, a correction coefficient is calculated by using the measured pressure value stored in the memory 8b in S1 and the pressure value (calculated pressure value) calculated in S3. More specifically, a correction coefficient for correcting the weight of the high-pressure gas-liquid separator 4 detected by the weight sensor 5 is calculated based on the calculated pressure value and the measured pressure value detected by the pressure sensor 9.

When the calculated pressure value is represented by Pa, the weight of the high-pressure gas-liquid separator 4 detected by the weight sensor 5 is represented by W1a, the measured pressure value is represented by Pb, and the actual weight of the high-pressure gas-liquid separator 4 is represented by W1b, the following formula (VIII) is satisfied.

$$Pa:Pb = W1a:W1b \tag{VIII}$$

As a result, the correction coefficient for the weight detected by the weight sensor 5 is Pb/Pa. Subsequently, in S5, the correction coefficient (Pb/Pa) calculated in S4 is stored in the memory 8b, and the process ends.

When the correction coefficient calculated by the correction coefficient calculating unit 82 is stored in the memory 8b, the water level control unit 81 corrects the weight of the high-pressure gas-liquid separator 4 detected by the weight sensor 5 by using the correction coefficient stored in the memory 8b, and controls the water level based on the weight corrected with the correction coefficient. At this time, the correction may be performed without stopping application of the electrolytic voltage (boosting), or the correction may be performed after the application is stopped once, and then the application may be started again.

Figure 4:
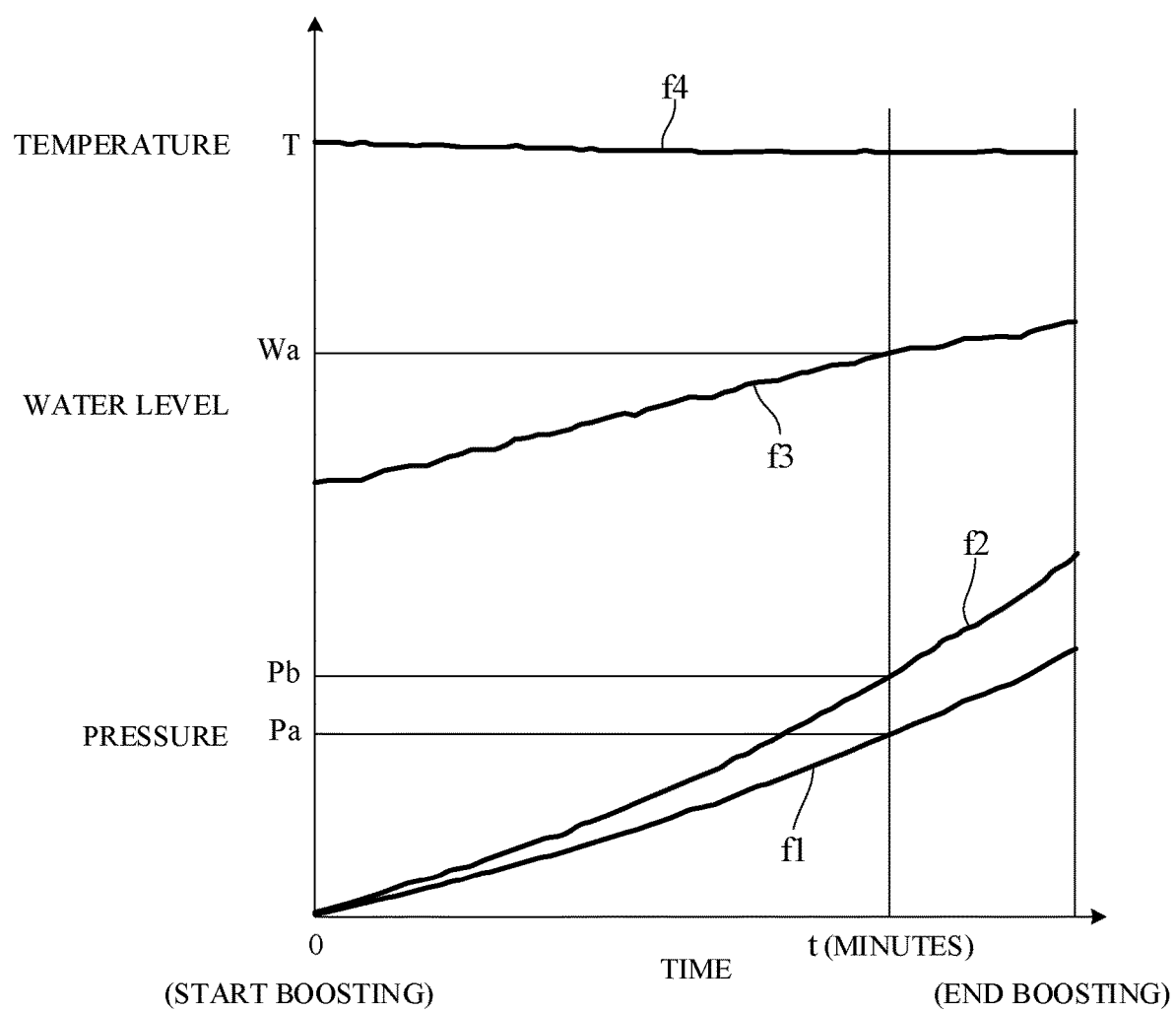
FIG. 4 is a diagram illustrating characteristics of a measured pressure value and a calculated pressure value in a vessel when a high-pressure gas-liquid separator illustrated in FIG. 1 is boosted, characteristics of a water level in the vessel calculated based on weight of the high-pressure gas-liquid separator, and characteristics of temperature in a container where the water electrolysis system is disposed.

FIG. 4 is a diagram illustrating characteristics of a measured pressure value and a calculated pressure value in the vessel 40 when the high-pressure gas-liquid separator 4 illustrated in FIG. 1 is boosted (during application of the electrolytic voltage), characteristics of a water level in the vessel 40 calculated based on the weight of the high-pressure gas-liquid separator 4, and characteristics of temperature in a container where the water electrolysis system 1 is disposed.

In FIG. 4, f1 indicates characteristics of a calculated pressure value in the vessel 40 with time change, and f2 indicates characteristics of a measured pressure value in the vessel 40 with time change. f3 indicates characteristics of a water level in the vessel 40 calculated based on the weight of the high-pressure gas-liquid separator 4 measured by the weight sensor 5 with time change, and f4 indicates characteristics of temperature in the container where the water electrolysis system 1 is disposed with time change.

The measured pressure value and the water level detected based on the weight sensor 5 (the weight of the high-pressure gas-liquid separator 4) gradually rise with a lapse of time because hydrogen gas and water are stored in the high-pressure gas-liquid separator 4 by application of the electrolytic voltage (boosting) (S1). At this time, as illustrated in the characteristics f4 of FIG. 4, since temperature T in the container is substantially constant, the known amount of saturated steam is substantially constant. Then, as illustrated in the characteristics f2 of FIG. 4, t minutes after start of application (start of boosting), the measured pressure value reaches a predetermined value Pb satisfying the condition for calculating the correction coefficient, and as illustrated in the characteristics f1 of FIG. 4, the calculated pressure value at this time is Pa (S3).

As illustrated in the characteristics f1 and f2 of FIG. 4, the calculated pressure value Pa t minutes after start of application (start of boosting) is lower than the measured pressure value (For example, the predetermined value Pb) (for example, Pa<Pb). That is, the actual pressure in the vessel 40 is higher than the pressure in the vessel 40 calculated based on the water level (weight) detected by the weight sensor 5, and an error occurs between the measured pressure value and the calculated pressure value. Therefore, a correction coefficient used for correcting an error of the water level (weight) detected by the weight sensor 5 (for example, Pb/Pa) is calculated by the correction coefficient calculating unit 82 and stored (S4 and S5). Then, the water level Wa (weight W1a) detected based on the weight sensor 5 is multiplied by the correction coefficient Pb/Pa, and the water level is controlled by the water level control unit 81 with the corrected water level (actual weight W1b).

The present embodiment can achieve advantages and effects such as the following:

(1) The water electrolysis system 1 includes: the high-pressure water electrolysis stack 3 configured to electrolyze water to generate gas including oxygen and hydrogen; the high-pressure gas-liquid separator 4 configured to separate a gas phase including hydrogen from a liquid phase of the gas generated by the high-pressure water electrolysis stack 3; the weight sensor 5 configured to detect the weight of the high-pressure gas-liquid separator 4; the pressure sensor 9 configured to detect the internal pressure of the vessel 40 of the high-pressure gas-liquid separator 4; and the controller 8 (correction coefficient calculating unit 82) configured to calculate the correction coefficient for correcting the error of the weight of the high-pressure gas-liquid separator 4 detected by the weight sensor 5 based on the internal pressure of the vessel 40 of the high-pressure gas-liquid separator 4 detected by the pressure sensor 9 (FIG. 1).

With this configuration, the detection error of the water level in the vessel 40 of the high-pressure gas-liquid separator 4 can be easily calculated. In addition, the detection error of the water level in the vessel 40 of the high-pressure gas-liquid separator 4 can be calculated without stopping the water electrolysis system 1, that is, even during operation of the water electrolysis system 1. In addition, for example, the error of the water level in the vessel 40 of the high-pressure gas-liquid separator 4 can be easily calculated without disposing a transparent window capable of confirming the inside from the outside in the vessel 40 of the high-pressure gas-liquid separator 4, using neutron radiography or ultrasonic echo, or disposing a plurality of water level sensors in the vessel 40. That is, the error of the water level in the vessel 40 can be detected with an inexpensive configuration.

(2) The controller 8 is configured to calculate the internal pressure of the vessel 40 of the high-pressure gas-liquid separator 4 based on the amount of hydrogen generated by the high-pressure water electrolysis stack 3 and the weight of the high-pressure gas-liquid separator 4 detected by the weight sensor 5, and to calculate the correction coefficient for correcting the error of the weight of the high-pressure gas-liquid separator 4 detected by the weight sensor 5 based on the calculated pressure value and the actual pressure value detected by the pressure sensor 9 (FIG. 2). As a result, the detection error of the water level in the vessel 40 of the high-pressure gas-liquid separator 4 can be easily calculated.

(3) The water electrolysis system 1 further includes: the high-pressure draining device 6 configured to drain water in the vessel 40 of the high-pressure gas-liquid separator 4; and the water level control unit 81 configured to correct the weight (water level) of the high-pressure gas-liquid separator 4 detected by the weight sensor 5 based on the correction coefficient calculated by the correction coefficient calculating unit 82, and to control opening and closing of the solenoid valve 47a of the high-pressure draining device 6 based on the weight (water level) corrected (FIG. 1).

As a result, the controller 8 can easily and accurately control the water level in the vessel 40 of the high-pressure gas-liquid separator 4. For example, even when the weight sensor 5 is used to detect the water level in the vessel 40 of the high-pressure gas-liquid separator 4, the controller 8 can accurately control the water level in the vessel 40 of the high-pressure gas-liquid separator 4. Therefore, an inexpensive and highly accurate water electrolysis system can be easily configured.

(4) The weight sensor 5 constitutes the water level detector configured to detect the water level in the vessel of the high-pressure gas-liquid separator 4 based on the weight of the high-pressure gas-liquid separator 4 (FIG. 1). This makes it possible to provide a highly accurate water electrolysis system with an inexpensive configuration without using an expensive sensor such as an electrostatic capacity-type water level sensor.

(5) The water level error calculation apparatus is configured to calculate the detection error of the water level in the high-pressure gas-liquid separator 4 separating the gas phase including hydrogen from the liquid phase of the gas generated by the high-pressure water electrolysis stack 3 configured to electrolyze water to generate the gas including oxygen and hydrogen. The water level error calculation apparatus includes: the weight sensor 5 configured to detect the weight of the high-pressure gas-liquid separator 4; the pressure sensor 9 configured to detect the internal pressure of the vessel 40 of the high-pressure gas-liquid separator 4; and the controller 8 (correction coefficient calculating unit 82) configured to calculate the correction coefficient for correcting the error of the weight of the high-pressure gas-liquid separator 4 detected by the weight sensor 5 based on the internal pressure of the vessel 40 of the high-pressure gas-liquid separator 4 detected by the pressure detector 9 (FIG. 1). With this configuration, the detection error of the water level in the vessel 40 of the high-pressure gas-liquid separator 4 can be easily calculated.

In the above embodiment, the description has been given by using the weight sensor 5 as the water level detector. However, a water level sensor may be used as a water level detector, and for example, an electrostatic capacity-type water level sensor may be used. In this case, a pressure generated in the vessel 40 may be calculated based on the amount of hydrogen generated by the high-pressure water electrolysis stack 3 and the water level in the vessel 40 of the high-pressure gas-liquid separator 4 detected by the water level sensor, and a correction coefficient used for correcting an error of the water level in the vessel 40 detected by the water level sensor may be calculated based on the calculated pressure value and a measured pressure value detected by the pressure sensor 9.

In the above embodiment, the correction coefficient calculating process is started when a command from a user is input. However, correction coefficient calculating process is started not only when a command from a user is input, but may also be started at another timing such as when the water electrolysis system 1 is started or when a predetermined time has elapsed after start of operation of the water electrolysis system 1.

In the above embodiment, as a condition for calculating correction coefficient in correction coefficient calculating process, it is determined whether or not the measured pressure value detected by the pressure sensor 9 is equal to or more than a predetermined value. However, it may be determined whether or not the weight of the high-pressure gas-liquid separator 4 detected by the weight sensor 5 is equal to or more than a predetermined weight, whether or not the amount of hydrogen manufactured by the high-pressure water electrolysis stack 3 is equal to or more than a predetermined amount, and the like.

In the above embodiment, in the correction coefficient calculating process, the condition for calculating the correction coefficient is determined (S2). However, the pressure value based on the weight of the high-pressure gas-liquid separator 4 may be calculated (S3) without determining the calculation condition. That is, the determination of the calculation condition may be omitted. In this case, after the correction coefficient is stored, for example, it may be determined whether or not a predetermined time has elapsed since start of boosting, and if the condition is not satisfied, the pressure value may be calculated again.

In the above embodiment, the correction coefficient is calculated by using the calculated pressure value and the measured pressure value during boosting (during application of the electrolytic voltage). However, the correction coefficient may be calculated by using the calculated pressure value and the measured pressure value during decompression.

The above embodiment can be combined as desired with one or more of the above modifications. The modifications can also be combined with one another.

According to the present invention, it becomes possible to easily calculate detection error of water level in a gas-liquid separator used in a water electrolysis system.

Above, while the present invention has been described with reference to the preferred embodiments thereof, it will be understood, by those skilled in the art, that various changes and modifications may be made thereto without departing from the scope of the appended claims.

What is claimed is:

1. A water electrolysis system, comprising:
a water electrolyzer configured to electrolyze water to generate gas including oxygen and hydrogen;
a gas-liquid separator configured to separate a gas phase including hydrogen from a liquid phase of the gas generated by the water electrolyzer;
a water level detector configured to detect a water level in the gas-liquid separator;
a pressure detector configured to detect a pressure of the gas phase in the gas-liquid separator; and
a CPU and a memory coupled to the CPU, wherein
the CPU is configured to perform:
calculating an error of the water level in the gas-liquid separator detected by the water level detector based on the pressure of the gas phase in the gas-liquid separator detected by the pressure detector;
calculating the pressure of the gas phase in the gas-liquid separator based on an amount of hydrogen generated by the water electrolyzer and the water level in the gas-liquid separator detected by the water level detector; and
calculating the error of the water level in the gas-liquid separator detected by the water level detector based on the pressure of the gas phase calculated and the pressure of the gas phase detected by the pressure detector.

2. The water electrolysis system according to claim 1, further comprising:
a draining device configured to drain water in the gas-liquid separator, wherein
the CPU is configured to perform:
correcting the water level in the gas-liquid separator detected by the water level detector based on the error of the water level calculated; and
controlling the draining device based on the water level corrected.

3. The water electrolysis system according to claim 2, wherein
the CPU is configured to perform:
controlling the draining device so as not to fill up nor empty out the gas-liquid separator.

4. The water electrolysis system according to claim 1, wherein
the water level detector is a weight sensor configured to detect the water level in the gas-liquid separator based on a weight of the gas-liquid separator.

5. The water electrolysis system according to claim 4, wherein
the gas-liquid separator includes a substantially cylindrical vessel, wherein
the water level detector is configured to detect the water level in the vessel, wherein
the pressure detector is configured to detect the pressure of the gas phase in the vessel, wherein
the water level detector is disposed in contact with a bottom of the vessel.

6. The water electrolysis system according to claim 1, wherein
the gas-liquid separator is connected to a cathode side of the water electrolyzer and is connected to a back pressure valve set to a predetermined pressure, wherein
the pressure of the gas phase in the gas-liquid separator increases in accordance with an amount of hydrogen generated on the cathode side of the water electrolyzer up to the predetermined pressure.

7. The water electrolysis system according to claim 6, wherein
the pressure detector is attached to a piping connecting the cathode side of the water electrolyzer and the gas-liquid separator.

8. A water electrolysis system, comprising:
a water electrolyzer configured to electrolyze water to generate gas including oxygen and hydrogen;
a gas-liquid separator configured to separate a gas phase including hydrogen from a liquid phase of the gas generated by the water electrolyzer;
a water level detector configured to detect a water level in the gas-liquid separator;
a pressure detector configured to detect a pressure of the gas phase in the gas-liquid separator; and
a CPU and a memory coupled to the CPU, wherein
the CPU is configured to function as:
an arithmetic unit configured to calculate an error of the water level in the gas-liquid separator detected by the water level detector based on the pressure of the gas phase in the gas-liquid separator detected by the pressure detector, to calculate the pressure of the gas phase in the gas-liquid separator based on an amount of hydrogen generated by the water electrolyzer and the water level in the gas-liquid separator detected by the water level detector, and to calculate the error of the water level in the gas-liquid separator detected by the water level detector based on the pressure of the gas phase calculated and the pressure of the gas phase detected by the pressure detector.

9. The water electrolysis system according to claim 8, further comprising:
a draining device configured to drain water in the gas-liquid separator, wherein
the CPU is configured to function as:
a drainage control unit configured to correct the water level in the gas-liquid separator detected by the water level detector based on the error of the water level calculated by the arithmetic unit, and to control the draining device based on the water level corrected.

10. The water electrolysis system according to claim 9, wherein
the drainage control unit is configured to control the draining device so as not to fill up nor empty out the gas-liquid separator.

11. The water electrolysis system according to claim 8, wherein
the water level detector is a weight sensor configured to detect the water level in the gas-liquid separator based on a weight of the gas-liquid separator.

12. The water electrolysis system according to claim 11, wherein
the gas-liquid separator includes a substantially cylindrical vessel, wherein
the water level detector is configured to detect the water level in the vessel, wherein
the pressure detector is configured to detect the pressure of the gas phase in the vessel, wherein
the water level detector is disposed in contact with a bottom of the vessel.

13. The water electrolysis system according to claim 8, wherein
the gas-liquid separator is connected to a cathode side of the water electrolyzer and is connected to a back pressure valve set to a predetermined pressure, wherein
the pressure of the gas phase in the gas-liquid separator increases in accordance with an amount of hydrogen generated on the cathode side of the water electrolyzer up to the predetermined pressure.

14. The water electrolysis system according to claim 13, wherein
the pressure detector is attached to a piping connecting the cathode side of the water electrolyzer and the gas-liquid separator.

* * * * *